US010783346B2

(12) United States Patent
Hall

(10) Patent No.: US 10,783,346 B2
(45) Date of Patent: Sep. 22, 2020

(54) ENHANCING QUALITY OF A FINGERPRINT IMAGE

(71) Applicant: InvenSense, Inc., San Jose, CA (US)

(72) Inventor: Daniela Hall, Grenoble (FR)

(73) Assignee: InvenSense, Inc., San Jose, CA (US)

( * ) Notice: Subject to any disclaimer, the term of this patent is extended or adjusted under 35 U.S.C. 154(b) by 171 days.

(21) Appl. No.: 15/837,968

(22) Filed: Dec. 11, 2017

(65) Prior Publication Data

US 2019/0180078 A1 Jun. 13, 2019

(51) Int. Cl.
| G06K 9/00 | (2006.01) |
| G06T 7/11 | (2017.01) |
| G06K 9/03 | (2006.01) |
| G06T 7/30 | (2017.01) |
| G06K 9/46 | (2006.01) |
| G06T 5/50 | (2006.01) |

(52) U.S. Cl.
CPC ....... G06K 9/00073 (2013.01); G06K 9/0002 (2013.01); G06K 9/0008 (2013.01); G06K 9/00013 (2013.01); G06K 9/036 (2013.01); G06K 9/4642 (2013.01); G06T 5/50 (2013.01); G06T 7/11 (2017.01); G06T 7/30 (2017.01); G06T 2207/20182 (2013.01)

(58) Field of Classification Search
CPC ... G06K 9/00073; G06K 9/00013; G06T 7/11
See application file for complete search history.

(56) References Cited

U.S. PATENT DOCUMENTS

| 8,422,731 | B2* | 4/2013 | Gupta | G06K 9/00744 348/700 |
| 10,216,754 | B1* | 2/2019 | Douglis | G06F 16/1744 |
| 10,521,691 | B2* | 12/2019 | Najibikohnehshahri | G06K 9/00664 |
| 2002/0012454 | A1* | 1/2002 | Liu | G06K 9/00201 382/118 |
| 2004/0042642 | A1* | 3/2004 | Bolle | G06K 9/00006 382/115 |
| 2004/0076330 | A1* | 4/2004 | Sloan | G06K 9/3241 382/228 |
| 2004/0175041 | A1* | 9/2004 | Miller | G06K 9/00208 382/190 |
| 2005/0123177 | A1* | 6/2005 | Abiko | G06K 9/00114 382/124 |
| 2005/0261577 | A1* | 11/2005 | Ficaro | G06T 7/0012 600/425 |
| 2005/0286767 | A1* | 12/2005 | Hager | G06K 9/00208 382/190 |

(Continued)

OTHER PUBLICATIONS

Althuge et al. "IoT device fingerprinting with sequence based features" University of Helsinki (Dec. 2017) pp. 1-71.*

*Primary Examiner* — Mia M Thomas

(57) ABSTRACT

In a method for enhancing quality of a fingerprint image, a plurality of images is received, where the plurality of images comprises fingerprint images. An image of the plurality of images is selected as a reference image. Subsections of each image of the plurality of images are compared to corresponding subsections of the reference image. Based on the comparing, subsections of each image of the plurality of images are selected to utilize in generating an image average of the plurality of images. An image average of the plurality of images is generated utilizing selected subsections of the plurality of images.

25 Claims, 12 Drawing Sheets

(56) References Cited

U.S. PATENT DOCUMENTS

| | | | |
|---|---|---|---|
| 2006/0078172 A1* | 4/2006 | Zhang | G06K 9/00268 382/118 |
| 2007/0036373 A1* | 2/2007 | Townsend | H04M 1/6016 381/312 |
| 2007/0047777 A1* | 3/2007 | Adachi | G06K 9/00087 382/124 |
| 2010/0061587 A1* | 3/2010 | Gupta | G06K 9/00744 382/100 |
| 2010/0098302 A1* | 4/2010 | Shin | G06K 9/00906 382/124 |
| 2012/0020573 A1* | 1/2012 | Kacenjar | G06T 7/337 382/218 |
| 2013/0259321 A1* | 10/2013 | Aoki | G06K 9/00885 382/115 |
| 2014/0079300 A1* | 3/2014 | Wolfer | G06K 9/00013 382/124 |
| 2014/0126783 A1* | 5/2014 | Nagasaka | G06K 9/00919 382/124 |
| 2014/0354596 A1* | 12/2014 | Djordjev | G06F 3/0421 345/175 |
| 2015/0036847 A1* | 2/2015 | Donaldson | H04S 7/303 381/303 |
| 2015/0131877 A1* | 5/2015 | Ivanov | G06K 9/00899 382/124 |
| 2015/0341410 A1* | 11/2015 | Schrempp | H04L 65/605 709/231 |
| 2016/0070967 A1* | 3/2016 | Du | G06K 9/0002 382/124 |
| 2016/0371691 A1* | 12/2016 | Kang | G06F 3/04842 |
| 2016/0377698 A1* | 12/2016 | Nielsen | G01S 5/16 342/450 |
| 2017/0103253 A1* | 4/2017 | Pyun | G06T 7/11 |
| 2017/0308729 A1* | 10/2017 | Chung | G06K 9/00912 |
| 2017/0323131 A1* | 11/2017 | Lu | G01N 29/14 |
| 2018/0126901 A1* | 5/2018 | Levkova | G06K 9/00597 |
| 2018/0202978 A1* | 7/2018 | Wrobel | G01N 29/024 |
| 2018/0253588 A1* | 9/2018 | Aronoff-Spencer | G06K 9/00919 |
| 2018/0268186 A1* | 9/2018 | Zhou | G06K 9/0002 |
| 2019/0004163 A1* | 1/2019 | Schneider | G01S 15/931 |
| 2019/0087559 A1* | 3/2019 | Zhou | G07C 9/37 |
| 2019/0087632 A1* | 3/2019 | Raguin | G06K 9/00919 |
| 2019/0122023 A1* | 4/2019 | Chen | G06K 9/0002 |
| 2019/0188442 A1* | 6/2019 | Flament | G06T 5/002 |

\* cited by examiner

ENHANCING QUALITY OF A FINGERPRINT IMAGE

BACKGROUND

Image based classification refers to a computer-implemented process for pattern recognition based on contextual information within images. Image based classification is dependent on image quality in order to obtain reliable classification results. For example, noisy and low contrast images produce generally unreliable classification results. In security applications, such as fingerprint authentication, the reliability of the classification results is directly linked to the reliability and functionality of the security application itself, such that image quality is a significant concern.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
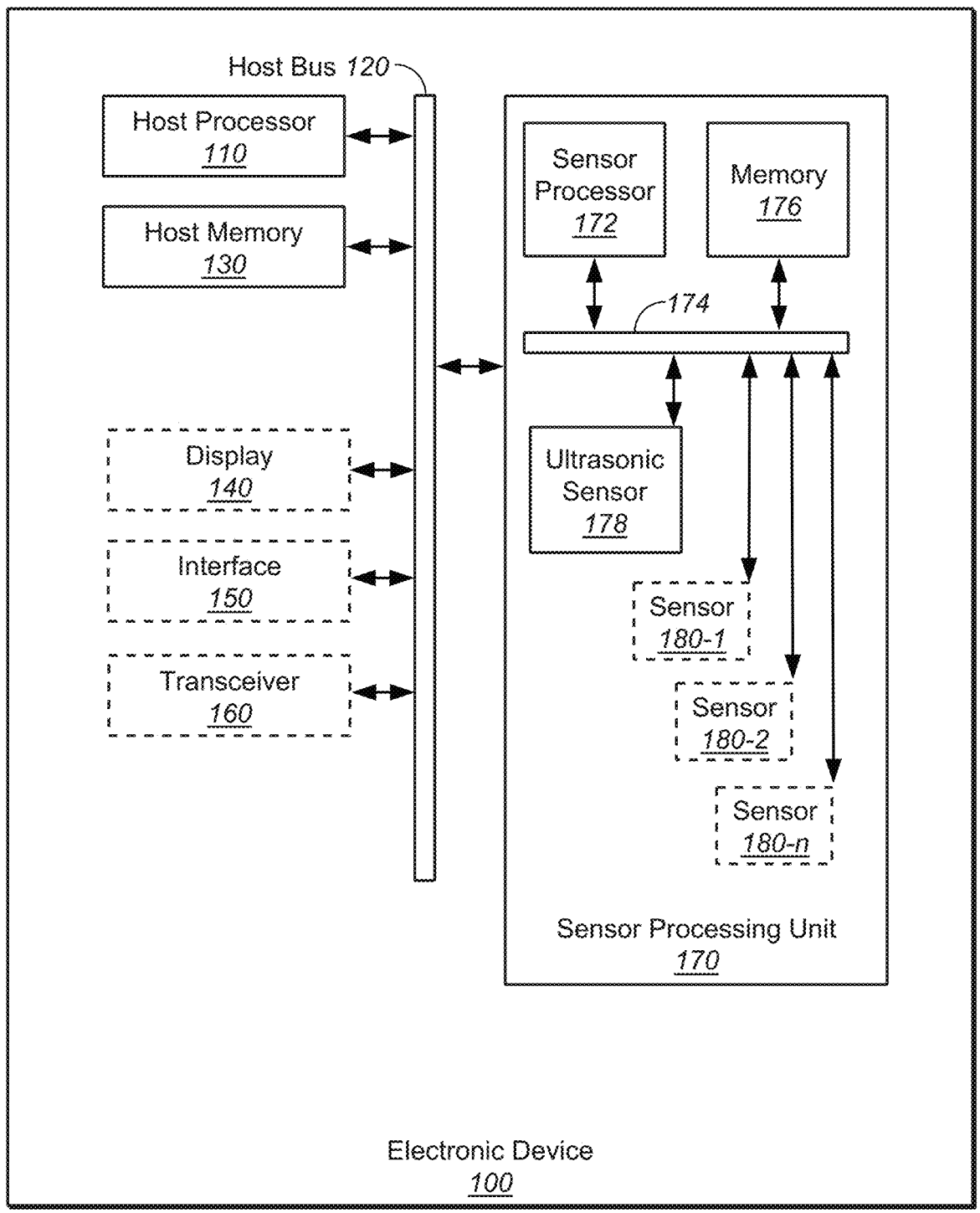
FIG. 1 is a block diagram of an example mobile electronic device upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "selecting," "comparing," "determining," "generating," "aligning," "applying," or the like, refer to the actions and processes of an electronic device such as an electrical circuit.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example electronic device with which or upon which various embodiments described herein may be implemented. Examples of enhancement of an image average are then described. Example methods of operation are then described.

Embodiments described herein provide methods for enhancing quality of a fingerprint image. In one embodiment, a plurality of images is received, where the plurality of images comprises fingerprint images. An image of the plurality of images is selected as a reference image. Subsections of each image of the plurality of images are compared to corresponding subsections of the reference image. Based on the comparing, subsections of each image of the plurality of images are selected to utilize in generating an image average of the plurality of images. An image average of the plurality of images is generated utilizing selected subsections of the plurality of images.

Example Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a door knob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, door knobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated SPU 170 which includes sensor processor 172, memory 176, an ultrasonic sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown).

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that ultrasonic sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from ultrasonic sensor 178 and/or one or more sensor 180, as well as the received data either in its raw form or after some processing. Such algorithms and routines may be implemented by sensor processor 172 and/or by logic or processing capabilities included in ultrasonic sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In one example, sensor 180-1 may comprise an acoustic sensor, sensor 180-2 may comprise a second acoustic sensor, and sensor 180-n may comprise a motion sensor.

In some embodiments, ultrasonic sensor 178 and/or one or more sensors 180 may be implemented using a microelectromechanical system (MEMS) that is integrated with sensor processor 172 and one or more other components of SPU 170 in a single chip or package. Although depicted as being included within SPU 170, one, some, or all of ultrasonic sensor 178 and/or one or more sensors 180 may be disposed externally to SPU 170 in various embodiments.

Figure 2:
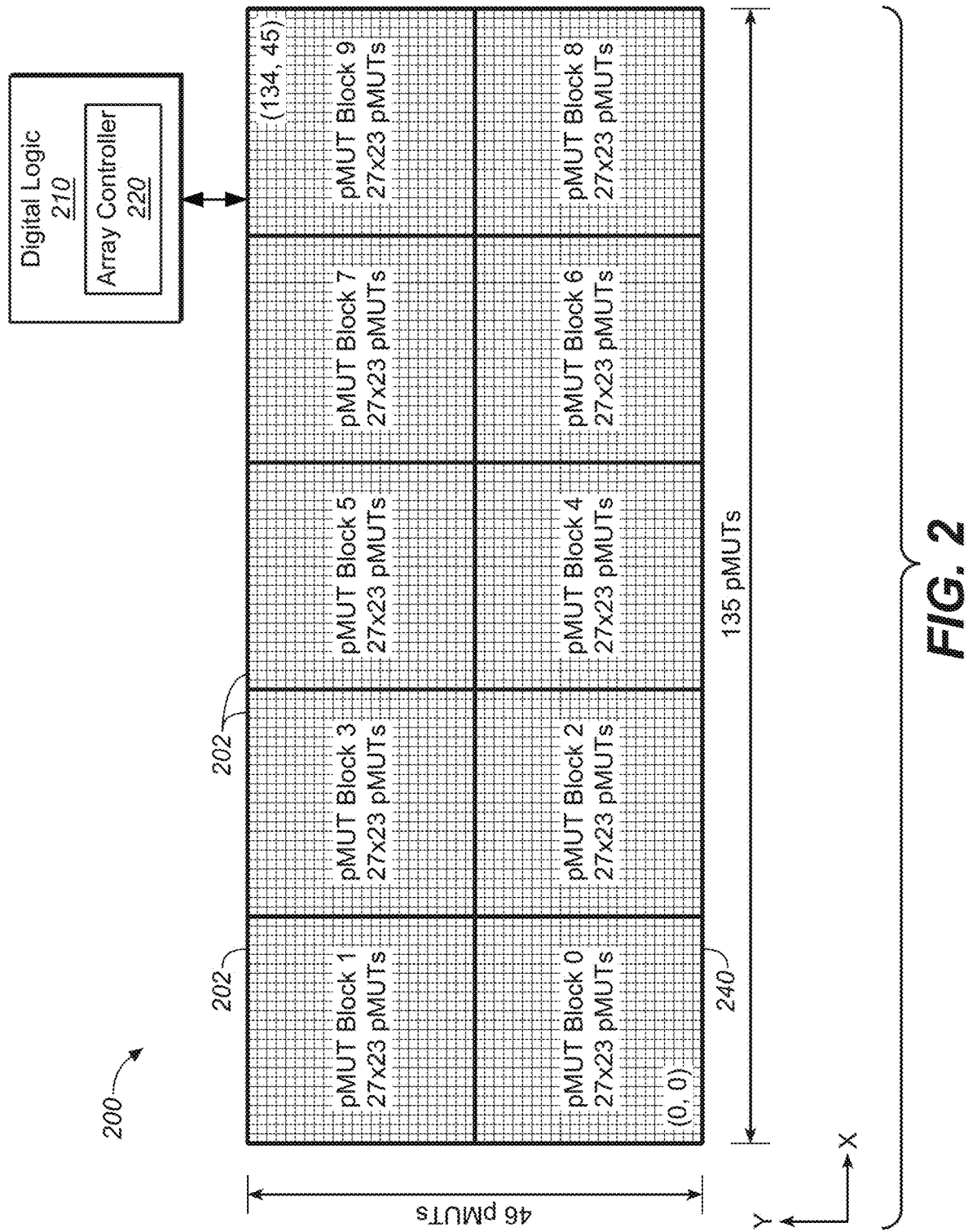
FIG. 2 illustrates an example ultrasonic sensor including an array of ultrasonic transducers, according to some embodiments.

FIG. 2 illustrates an example ultrasonic sensor 200, according to an embodiment. Ultrasonic sensor 200 includes digital logic 210 and two-dimensional array 240 of ultrasonic transducers. Two-dimensional array 240 includes ten independently controllable sub-blocks 202 (also referred to herein as "sub-arrays"). In one embodiment, digital logic 210 includes array controller 220. It should be appreciated that two-dimensional array 240 may include any number of sub-blocks of ultrasonic transducers, of which the illustrated embodiment is one example. In one embodiment, the ultrasonic transducers are Piezoelectric Micromachined Ultrasonic Transducer (PMUT) devices. In one embodiment, the PMUT devices include an interior support structure.

The described two-dimensional array 240 of ultrasonic transducers can be used for generation of acoustic signals or measurement of acoustically sensed data in various applications, such as, but not limited to, medical applications, security systems, biometric systems (e.g., fingerprint sensors, distance sensors, and/or motion/gesture recognition sensors), mobile communication systems, industrial automation systems, consumer electronic devices, robotics, etc. In various embodiments, ultrasonic sensor 200 is an ultrasonic fingerprint sensor unit or an ultrasonic fingerprint sensor device.

In operation, during transmission, selected sets of ultrasonic transducers in two-dimensional array 240 can transmit an acoustic signal (e.g., a short ultrasonic pulse) and during sensing, a set of active ultrasonic transducers in two-dimensional array 240 can detect an interference of the acoustic signal with an object (in the path of the acoustic wave). For example, interference may lead to reflection of the acoustic signal due to the object, and the reflected signal may then be detected. In various embodiments, the selected set of ultrasonic transducers that transmit acoustic signals includes different ultrasonic transducers than those of the selected set used during sensing of reflected acoustic signals. The received interference signal (e.g., generated based on reflections, echoes, etc. of the acoustic signal from the object) can then be analyzed. As an example, an image of the object, a distance of the object from the sensing component, a density of the object, a motion of the object, etc., can all be determined based on comparing an amplitude of the interference signal with an amplitude of the acoustic signal. Moreover, results generated can be further analyzed or presented to a user via a display device (not shown).

Array controller 220 controls activation of ultrasonic transducers during a transmit operation according to a beamforming pattern. In one embodiment, array controller 220 controls activation of ultrasonic transducers of more than one sub-block 202 of ultrasonic transducers during a transmit operation according to the beamforming pattern of each instance of the beamforming space, where the beamforming pattern is applied to the more than one sub-block 202 of ultrasonic transducers in parallel.

In some embodiments, a two-dimensional array 240 of individual ultrasonic transducers corresponds with a two-dimensional array of control electronics. This embodiment also applies to other types of MEMS arrays with integrated control electronics. This includes, but is not limited to, applications for inertial sensors, optical devices, display devices, pressure sensors, microphones, inkjet printers, and other applications of MEMS technology with integrated mixed-signal electronics for control. It should be appreciated that while the described embodiments may refer CMOS control elements for controlling MEMS devices and/or PMUT devices, that the described embodiments are not intended to be limited to such implementations.

FIG. 2 illustrates an example two-dimensional array 240, in accordance with an embodiment. For example, he two-dimensional array 240 can be comprised of 135×46 ultrasonic transducers arranged into a rectangular grid as shown in FIG. 2. It should be appreciated that two dimensional array 240 can include any number of ultrasonic transducers, e.g., 135×46 ultrasonic transducers or 131×62 ultrasonic transducers. However, this is but one example of how the PMUT transducers may be arranged. To allow for consistent referencing of locations within two-dimensional array 240, the long dimension is defined herein as the X-axis, the short dimension as the Y-axis, and bottom left corner as the origin. As such (using units of ultrasonic transducers as the coordinate system), the ultrasonic transducer at the bottom left corner is at position (0, 0) whereas the ultrasonic transducer at the top right corner is at position (134, 45).

In the illustrated example, the ten "PMUT Blocks" 202 (also referred to as "ADC areas" or "array sub-blocks") are 27×23 PMUTs in size. However, it should be appreciated that PMUT blocks 202 can be any size, e.g., 31×23 PMUTs. Thus, the ultrasonic sensor may comprise a number, here, ten, of blocks of ultrasonic transducers. It should be appreciated that two-dimensional array 240 can include any number of ultrasonic transducers arranged in to any number of blocks, of which the illustrated embodiment is one example. In accordance with various embodiments, imaging over the entire sensor area is accomplished by stepping the transmit beamforming patterns over the entire ultrasonic transducer array, transmitting and receiving at each location corresponding to an image pixel.

Examples of Enhancement of Quality of a Fingerprint Image

Image based classification refers to a computer-implemented process for pattern recognition based on contextual information within images. Image based classification are dependent on image quality in order to obtain reliable classification results. Embodiments described herein provide methods and systems for enhancing image quality of input image sets using image averaging, where images and/or portions of the image are selected for averaging based on similarity of the images and/or portions of the images of the input image set.

Figure 3A:
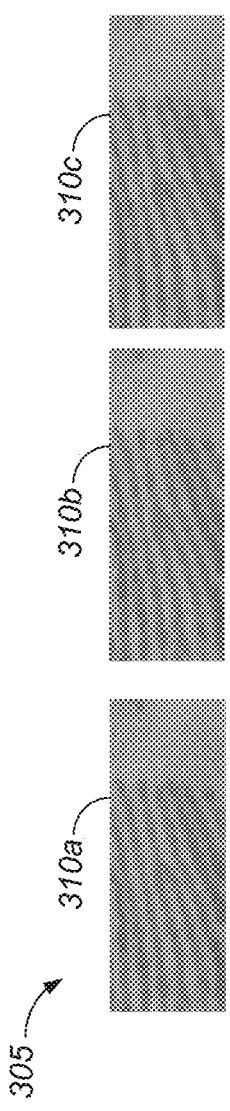
FIGS. 3A through 3C illustrate example input image sets, according to some embodiments.
Figure 3B:
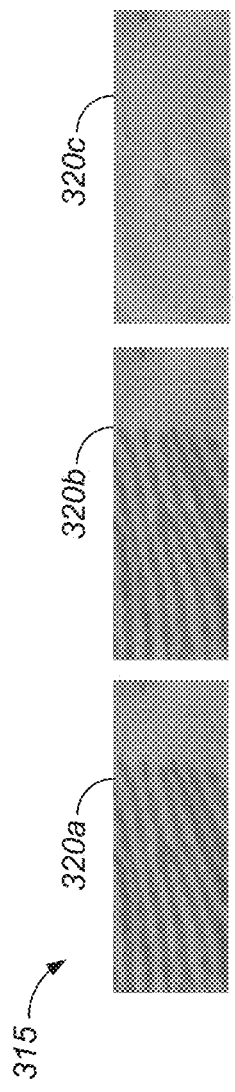
Figure 3C:
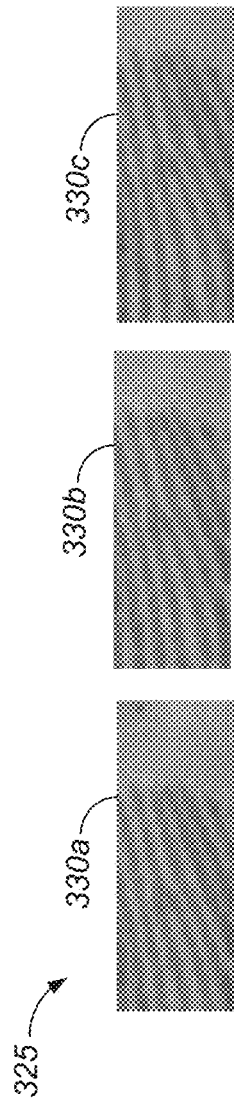

FIGS. 3A through 3C illustrate example input image sets of fingerprints, according to some embodiments. Embodiments herein provide methods for averaging input image sets, where images and/or portions of images of the input image set are selected for averaging based on a similarity of the images and/or portions of the images. It should be appreciated that similarity of images can include many different characteristics of an image, including without limitation: contrast level, presence/absence of imaged object, positioning of object within image, coloring of image, artifacts within image, presence of patterns within image such as ridge/valley patterns, etc.

FIGS. 3A through 3C illustrate the impact of differences among the images of an input image set on the image average. In various embodiments, image averaging refers to computing image average intensity for pixels of the input image set. In order to enhance image quality when generating an image average, embodiments described herein selectively include images and/or portions of the images of the input image set that are determined to be similar to each other (depending on the selected criteria), while disregarding any dissimilar images and/or portions of images. It should be appreciated that the images of an input image set can be received or captured by any type of image capture device, including without limitation, an optical sensor, a camera, an ultrasonic sensor, etc.

With reference to FIG. 3A, an example input image set 305 including images 310a, 310b, and 310c, is illustrated. In example input image set 305, images 310a, 310b, and 310c, are similar. In such an example, images 310a, 310b, and 310c, may be used in their entirety as part of image averaging to generate an image average.

With reference to FIG. 3B, an example input image set 315 including images 320a, 320b, and 320c, is illustrated. In example input image set 315, images 320a and 320b are similar to each other, while image 320c is different as no fingerprint pattern is present (e.g., only includes a background). In conventional image averaging, using images 320a, 320b, and 320c, in generating an image average would result in reduced image noise, while also reducing image signal. The impact in the reduction in image signal is higher for small input image sets.

With reference to FIG. 3C, an example input image set 325 including images 330a, 330b, and 330c, is illustrated. In example input image set 325, images 330a and 330b are similar to each other, while image 330c includes the same fingerprint (e.g., object), but the fingerprint is not in the same position as in images 330a and 330b. In conventional image averaging, using images 330a, 330b, and 330c, in generating an image average would result in reduced image noise, but effectively destroys the image signal by introducing artifacts into the image average. Image averaging using complete images 330a, 330b, and 330c, generates a damaged image that is unreliable for use in image classification.

Figure 4:
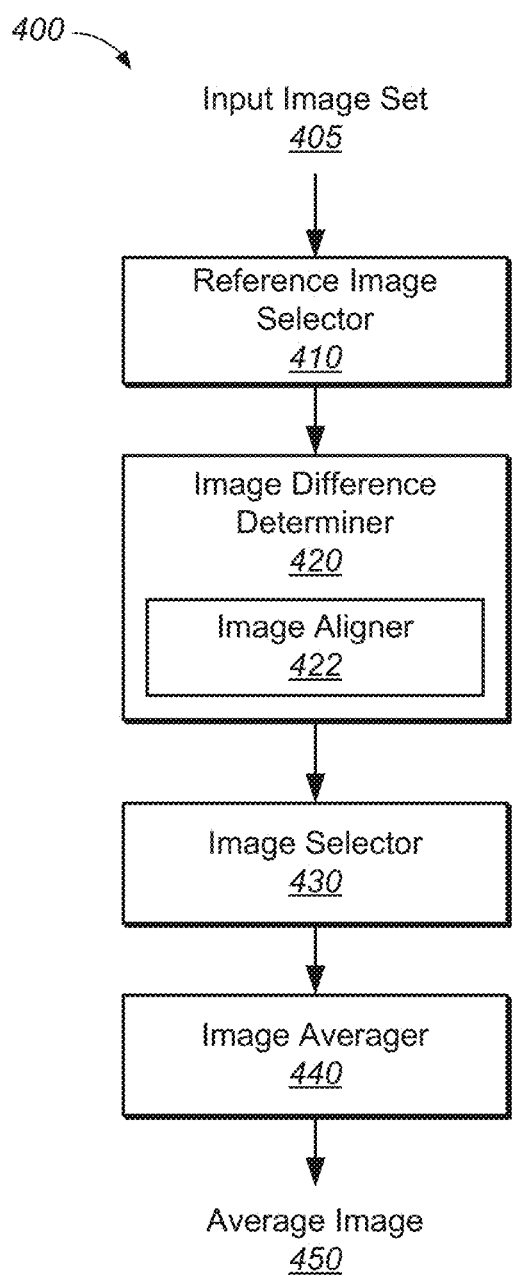
FIG. 4 illustrates an example system for enhancing quality of a fingerprint image by selecting images to include in image averaging, according to an embodiment.

FIG. 4 illustrates an example system 400 for enhancing quality of a fingerprint image by selecting images to include in image averaging, according to an embodiment. System 400 is configured to perform image averaging by selectively including images from input image set 405 that are determined to be similar in the generation of image average 450. It should be appreciated that system 400 can be implemented as hardware, software, or any combination thereof. It should be appreciated that the images of input image set 405 can be received or captured by any type of image capture device, including without limitation, an optical sensor, a camera, an ultrasonic sensor, etc.

Input image set 405 is received at reference image selector 410. It should be appreciated that input image set 405 may include any number of images. For example, input image set 405 may include only a few images, or may include up to 20-40 images. In one embodiment, input image set 405 includes images captured in a temporal sequence. For example, an ultrasonic sensor can capture a sequence of fingerprint images, which are received at system 400. In another embodiment, input image set 405 includes images of a fingerprint captured at different depths and/or sequential depths. For example, an ultrasonic sensor can capture images of a fingerprint at sequential depths (e.g., 0 µm, 10 µm, 20 µm, 30 µm, 40 µm etc.), which are received at system 400. The different depths may also be related to different depth features, e.g., the fingerprints at different layers such as the epidermal layer and dermal layer. It should be appreciated that in accordance with some embodiments, images captured at sequential depths may also be temporally sequential.

In some embodiments, more than one image averaging process may run in parallel. For example, system 400 may determine one surface fingerprint and one depth fingerprint in parallel. In this case the surface fingerprint may be averaged in a first process and produce a first average image, and the depth fingerprint may be averaged in a second process and produce a second average image. The depth fingerprint may include of average in time and over a certain depth. The depth fingerprint may be useful for fraud prevention by determining that the finger is a real finger and not a fake finger, since depth fingerprints are much harder to fake.

Averaging fingerprints over different depths may require additional procedures compared to averaging surface fingerprints over time. Fingerprint images at different depths may be slightly different and may require certain corrections before the averaging process. In addition to the more obvious deformation corrections, under some conditions image inversion may be required. The required additional procedures may be learned during the enrollment process when the user first enters his or her fingerprints. By comparing the fingerprints at different depths during the enrollment process, their similarities and differences may be recorded and any additional processing that is required in the depth averaging process may be determined and stored for later use.

In some embodiments, input image set 405 is acquired using an ultrasonic sensor (e.g., ultrasonic sensor 200) having a varying configuration, where the configuration can refer to an imaging depth of an image. In another embodiment, the configuration refers to a beam forming position of the ultrasonic sensor (e.g., beam forming at the center of ultrasonic transducers of the ultrasonic sensor or beam forming at an edge of ultrasonic transducers of the ultrasonic sensor).

In some embodiments, the set of images may be obtained from different time ranges of the reflected ultrasonic signal. An ultrasonic fingerprint sensor may include a stack of different layers, e.g., a CMOS layer, a MEMS layer, an acoustic coupling layer, an adhesion layer, and a cover (e.g., glass) layer. The impedance differences at the interfaces of these layers may lead to reflections. The fingerprint images may be constructed from the acoustic signal that was reflected by the finger of the user and then detected, without further reflections on any of the other interfaces in the sensor stack. Some of the acoustic signal that is reflected by the finger of the user may undergo additional reflections on the interfaces, but may still be detected after the additional reflections. The acoustic signal after the multiple reflections may also be used to construct images. Because these acoustic signals have undergone multiple reflections, they reach the detector at a later point. The Time-of-Flight (ToF) of the acoustic signal since the time of the emission of the acoustic signal may be used to separate the acoustic signals that have undergone multiple reflections. As such, the image set may be created from the acoustic signal using different ToF ranges, where each image represents the acoustic signal within a certain range of ToF. Thus, the different images correspond to different temporal ranges of the acoustic signal.

For example, the images with the lowest ToF range represent images from acoustic signals that have only reflected from the finger of the user, and the images with an increasing ToF range represent images from acoustic signals that have undergone more and more reflections. The different images in the image set thus correspond to images where the acoustic signal has undergone different amounts of reflections. For example, images from the different ToF ranges may include different and/or additional contributions that result in different backgrounds, but will also include image information from the fingerprint. During the intelligent averaging process, the fingerprint information from the different ToF images may be extracted and averaged, while the other contributions may be corrected for or neglected. It should be appreciated that many different image analysis or feature extraction techniques may be employed to separate the fingerprint information after the multiple reflections from the background acoustic signals, as will be understood by one of skill in the art, and which is not described herein so as to not obfuscate the described embodiments.

Reference image selector 410 is operable to select an image of input image set 405 as a reference image. A reference image, as used herein, refers to an image to which other images of input image set 405 are compared for purposes of selective inclusion for image averaging. In one embodiment, reference image selector 410 selects an image of input image set 405 having a highest contrast/contrast-to-noise level of the images of input image set 405 as the reference image. In one embodiment, reference image selector 410 is configured to determine a contrast for the images of input image set 405. In another embodiment, reference image selector 410 selects an image of input image set 405 having maximum variance of the grey levels of the images of input image set 405 as the reference image. In another embodiment, reference image selector 410 selects an image of input image set 405 having maximum likelihood of being a fingerprint image (based on a dedicated fingerprint detector) as the reference image. In another embodiment, reference image selector 410 selects an image of input image set 405 having maximum coverage of a desired characteristic or pattern, e.g., a ridge/valley pattern of a fingerprint likelihood of being a fingerprint image (based on a dedicated fingerprint detector) as the reference image.

Image difference determiner 420 is operable to determine whether an image is similar enough to the reference image for inclusion in the image average. In some embodiments, image difference determiner 420 includes image aligner 422 for aligning an image to the reference image prior to performing any image difference determination.

In some embodiments, during image capture of fingerprint images captured in sequence, the fingerprint may move relative to the ultrasonic sensor during image capture such that images including temporally sequential fingerprints may include the fingerprints at different positions within the images (e.g., the example of FIG. 3C). Image aligner 422 is operable to align images with the reference image, such that image difference determination is performed on aligned images.

Figure 5:
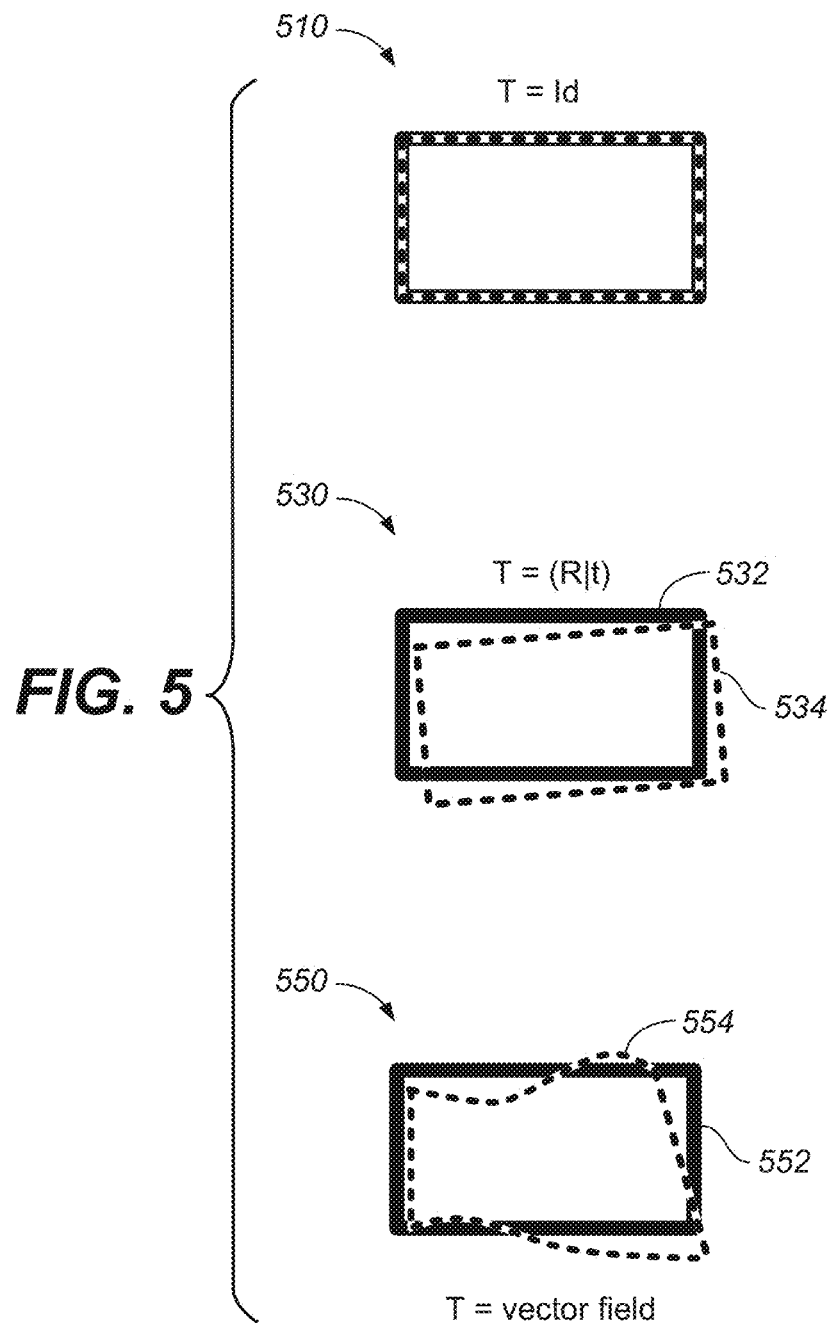
FIG. 5 illustrates examples of aligning an image to a reference image, according to some embodiments.

FIG. 5 illustrates examples of aligning an image to a reference image, according to some embodiments. It should be appreciated that the examples of FIG. 5 can be utilized by image aligner 422 in performing image alignment to a reference image. Moreover, it should be appreciated that other image alignment operations may be utilized by image aligner 422. Alignment operation 510 illustrates no transformation of the image as no alignment is necessary. Alignment operation 510 may be utilized where no translation and/or rotation of the fingerprint of an image relative to the reference image is observed. In other words, alignment operation 510 is used where the fingerprint is stable relative to the ultrasonic sensor. It should be appreciated that local deformation due to varying pressure of the finger on the ultrasonic sensor may be small and neglected, depending on the extent of the impact of the pressure on the image. As illustrated, the transformation used is the identity transformation Id, where the identity transformation copies the source data into the destination data without change.

Alignment operation 530 illustrates a rotation and translation of image 534 relative to reference image 532. Alignment operation 530 may be utilized where transformation of image 534 relative to reference image 532 is a rotation and/or translation. In other words, alignment operation 530 is used where the fingerprint moves relative to the ultrasonic sensor. It should be appreciated that local deformation due to varying pressure of the finger on the ultrasonic sensor may be small and neglected, depending on the extent of the impact of the pressure on the image. As illustrated, the transformation used is the translation t and rotation R, allowing for alignment of moving fingers. Certain limits may be imposed on the alignment operation, e.g., where a threshold maximum rotation angle and/or a threshold maximum translation distance is allowed. If one or both thresholds are passed, the image is not used in the averaging process.

Alignment operation 550 illustrates a applying a vector field to image 554 to account for local deformation of the fingerprint relative to reference image 552. Alignment operation 550 may be utilized where the fingerprint of image 554 is translated, rotated, and/or deformed relative to the fingerprint of reference image 552. In alignment operation 550, transformation is a vector field estimated by optical flow. Optical flow determines for each image subsection (e.g., pixel) individually where the image subsection has moved relative to reference image 552. This transformation provides alignment between image 554 and reference image 552, allowing for compensation of local deformation. As illustrated, the transformation used is a vector field, allowing for alignment of moving fingers and/or local deformation. Certain limits may be imposed on the alignment operation, e.g., by setting a maximum deformation threshold. If the deformation threshold is passed, the image is not used in the averaging process.

With reference again to FIG. 4, in some embodiments, image difference determiner 420 determines a difference between the reference image and each image of the input image set 405. For example, the difference determination can be performed at a subsection level or a pixel level, wherein a subsection/pixel for the image is compared to a spatially corresponding subsection/pixel of the reference image. The difference can be based on a gray level difference, where the difference is a number of gray levels between the compared subsection/pixel. In other embodiments, other difference determinations can be used, such as a color value difference. The energy of the differences is then determined, where the energy is based on a summation of the subsection/pixel differences for the image. An energy of the differences is generated for each image of input image set 405.

Image selector 430 is operable to determine whether an image of input image set 405 is select for use in image averaging. In one embodiment, image selector 430 receives the energy for each image of input image set 405. The energy for each image is then compared to a threshold energy value. If the energy of an image satisfies the threshold (e.g., is not greater than the threshold energy value deduced from expected sensor noise), the image is selected for inclusion in image averaging. Alternatively, if the energy of an image does not satisfy the threshold (e.g., is greater than the threshold energy value), the image is not selected for inclusion in image averaging. In one embodiment, images selected for inclusion in image averaging are forwarded to image averager 440.

In some embodiments, motion sensor information is received at image selector 430. The selection of an image may be based at least in part on the motion sensor information. For example, if the motion sensor information is indicative of high motion (e.g., exceeds a motion threshold), image averaging may not be performed as the imaged object (e.g., finger) would be unstable. This would reduce power consumption and improve performance by delaying image averaging during times of high motion. In another embodiment, motion sensor information can be used to determine the instant of first contact of an object (e.g., a finger) with the fingerprint sensor sensor. In case of a high frequency fingerprint sensor, images captured during the initial contact time (e.g., approximately the first 100 ms) can be discarded, as these images might not be stable. In another embodiment, the motion sensor information can be used to detect the moment after first contact where the finger is pressure on the ultrasonic sensor maximum (e.g., less motion should be detected at this moment than during first contact). The image averaging can begin with the images captured at maximum pressure or the image capture could be triggered at the moment of maximum contact. Motion sensor information can also be used to assist with image alignment (e.g., at image aligner 422).

Image averager 440 is operable to perform image averaging on the selected images of input image set 405. Image averager 440 computes image average intensity for pixels of the input image set 405, generating image average 450. By disregarding images of input image set 405 that are determined to be less similar to a reference image, image average 450 is an image of enhanced quality relative to an image average based on all images of input image set 405, including those that are less similar to a reference image.

In accordance with some embodiments, image averaging can include weighting images of the selected image set according to different factors. For example, where the input image set 405 include images taken at sequential depths, a particular depth may be weighted higher than other depths, or the weight of images in the image averaging decreases as the depth into the finger increases. In another example, the weight may depend on noise of an image, or differences between an image and the reference image.

In some embodiments, the averaging process may be triggered by a separate process, e.g., a finger detection algorithm. For an always-on fingerprint sensor, a background process may check if a finger is present on the sensor, and if this is the case, then start the averaging process followed by the authentication process. Thus, once a finger is detected on the sensor, the input image set may be acquired and the averaging process may be triggered. The input image set may be a fixed image set, and the reference image may be determined only once. In some embodiments, the input image set may be dynamic, for example, using a rolling window to acquire the input image set. In a dynamic input image set, the reference image may change, if a more appropriate reference image is detected, for example, if a new image with a higher contrast than the existing reference image is detected. In this case, the image difference determiner may start over using the new reference image in order to obtain a better image average.

Figure 6:
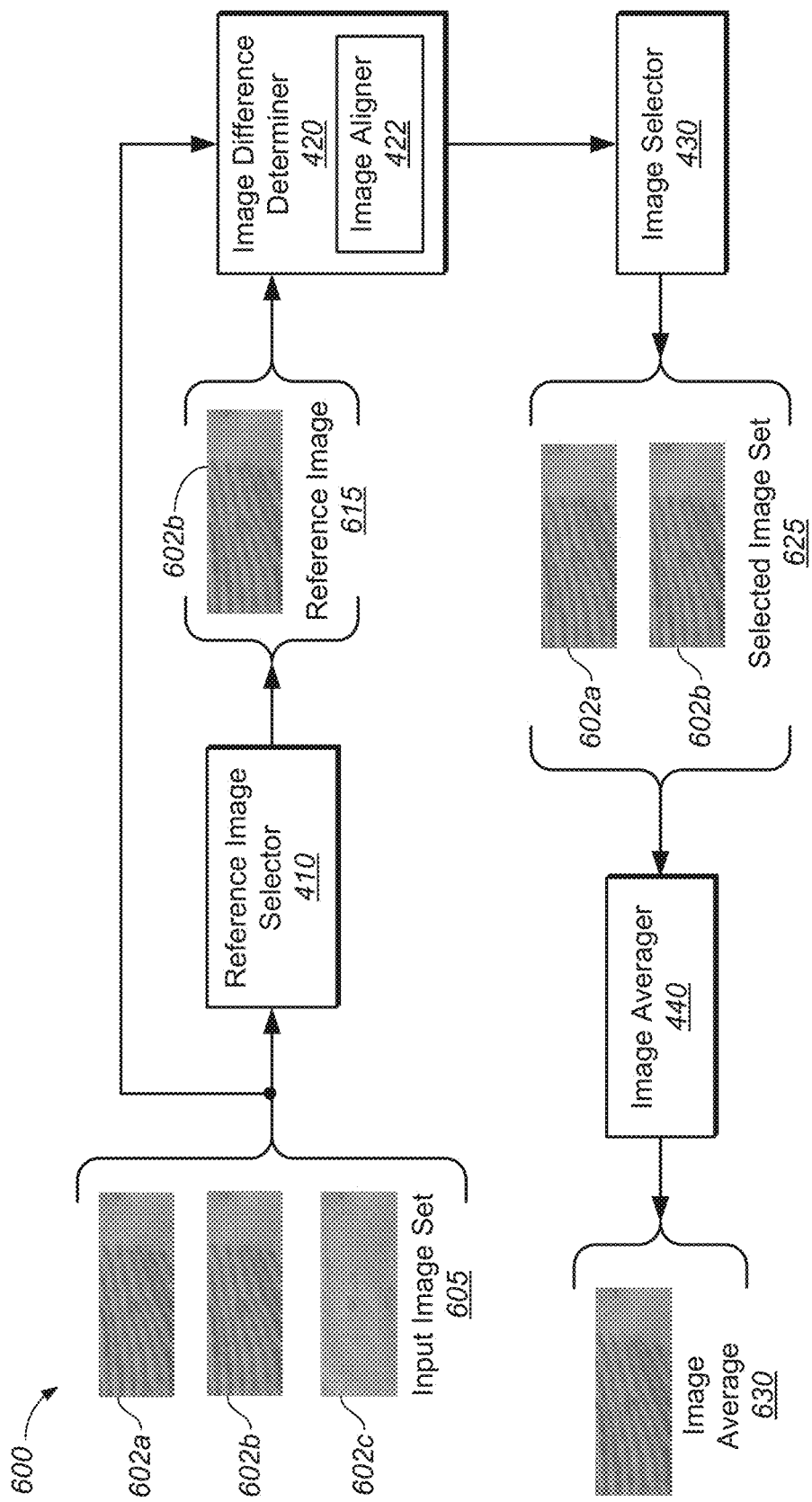
FIG. 6 illustrates an example data flow diagram of the system of FIG. 4, according to some embodiments.

FIG. 6 illustrates an example data flow diagram 600 of system 400 of FIG. 4, according to some embodiments. Input image set 605 is received at reference image selector 410. As illustrated, input image set includes three input images 602*a*, 602*b*, and 602*c*. It should be appreciated that input image set 605 may include any number of images. The illustration of three input images is for brevity and clarity only. In one embodiment, input image set 605 includes images captured in a temporal sequence. In another embodiment, input image set 605 includes images of a fingerprint captured at sequential depths. It should be appreciated that in accordance with some embodiments, images captured at sequential depths may also be temporally sequential.

Reference image selector 410 is operable to select an image of input image set 605 as a reference image 615. Reference image 615 is used as an image to which other images of input image set 605 are compared to for purposes of selective inclusion for image averaging. In one embodiment, reference image selector 410 selects an image of input image set 605 having a highest contrast of the images of input image set 605 as the reference image. In one embodiment, reference image selector 410 is configured to determine a contrast for the images of input image set 605. As illustrated, input image 602*b* is selected as reference image 615.

Image difference determiner 420 is operable to determine whether an image is similar enough to reference image 615 for inclusion in the image average. In some embodiments, image difference determiner 420 includes image aligner 422 for aligning an image to reference image 615 prior to performing any image difference determination. Image aligner 422 is operable to align images with reference image 615, such that image difference determination is performed on aligned images. It should be appreciated that the examples of FIG. 5 can be utilized by image aligner 422 is performing image alignment to reference image 615. Moreover, it should be appreciated that other image alignment operations may be utilized by image aligner 422.

Image difference determiner 420 determines a difference between reference image 615 and each image of the input image set 605. For example, the difference determination can be performed at a subsection level or a pixel level, wherein a subsection/pixel for the image is compared to a spatially corresponding subsection/pixel of the reference image. The difference can be based on a gray level difference, where the difference is a number of gray levels between the compared subsection/pixel. In other embodiments, other difference determinations can be used, such as a color value difference. The energy of the differences is then determined, where the energy is based on a summation of the subsection/pixel differences for the image. An energy of the differences is generated for each image of input image set 605.

Image selector 430 is operable to determine whether an image of input image set 605 is selected for use in image averaging. In one embodiment, image selector 430 receives the energy for each image of input image set 605. The energy for each image is then compared to a threshold energy value. If the energy of an image satisfies the threshold (e.g., is not greater than the threshold energy value), the image is selected for inclusion in selected image set 625 for use in image averaging. Alternatively, if the energy of an image does not satisfy the threshold (e.g., is greater than the threshold energy value), the image is not selected for inclusion in selected image set 625 for use in image averaging. In one embodiment, selected image set 625 is forwarded to image averager 440. As illustrated, input images 602a and 602b are selected for inclusion in selected image set 625 and input image 602c is not selected.

Image averager 440 is operable to perform image averaging on images of selected image set 625. Image averager 440 computes image average intensity for pixels of the selected image set 625, generating image average 630. By disregarding images of input image set 605 that are determined to be less similar to reference image 615, image average 630 is an image of enhanced quality relative to an image average based on all images of input image set 605, including those that are less similar to reference image 615.

Figure 7:
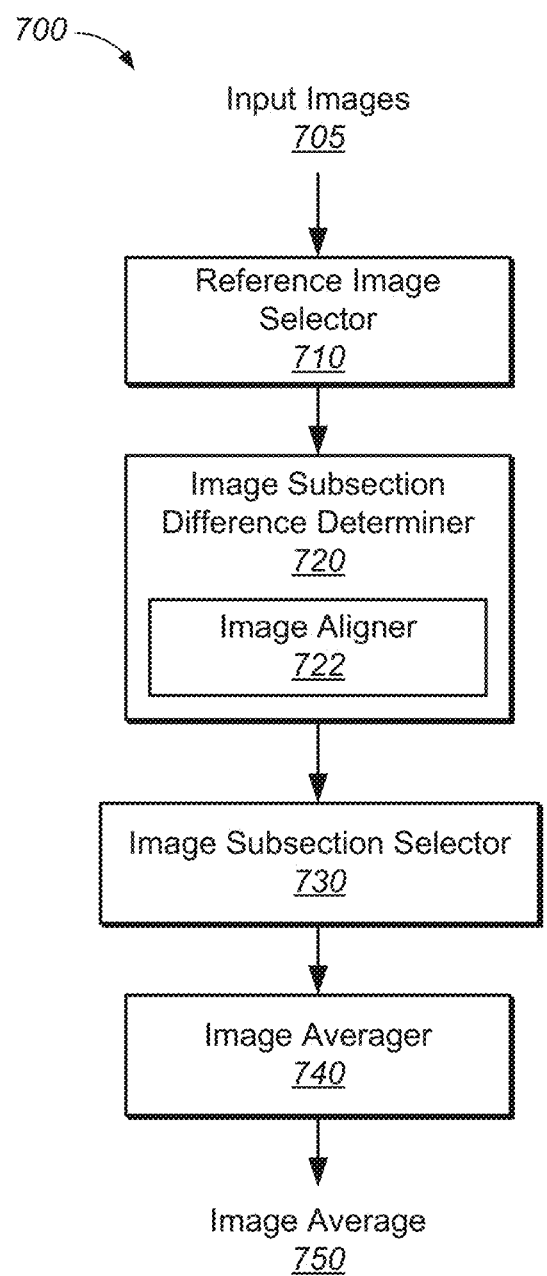
FIG. 7 illustrates an example system for enhancing quality of a fingerprint image by selecting subsections of images to include in image averaging, according to an embodiment.

FIG. 7 illustrates an example system 700 for enhancing quality of a fingerprint image by selecting subsections of images to include in image averaging, according to an embodiment. System 700 is configured to perform image averaging by selectively including image subsections (e.g., pixels) from input image set 705 that are determined to be similar in the generation of image average 750. It should be appreciated that system 700 can be implemented as hardware, software, or any combination thereof. It should be appreciated that the images of input image set 705 can be received or captured by any type of image capture device, including without limitation, an optical sensor, a camera, an ultrasonic sensor, etc.

Input image set 705 is received at reference image selector 710. It should be appreciated that input image set 705 may include any number of images. For example, input image set 705 may include 20-40 images. In one embodiment, input image set 705 includes images captured in a temporal sequence. In another embodiment, input image set 705 includes images of a fingerprint captured at different depths and/or sequential depths. It should be appreciated that in accordance with some embodiments, images captured at sequential depths may also be temporally sequential.

In some embodiments, more than one image averaging process may run in parallel. For example, system 700 may determine one surface fingerprint and one depth fingerprint in parallel. In this case the surface fingerprint may be averaged in a first process and produce a first average image, and the depth fingerprint may be averaged in a second process and produce a second average image. The depth fingerprint may include of average in time and over a certain depth. The depth fingerprint may be useful for fraud prevention by determining that the finger is a real finger and not a fake finger, since depth fingerprints are much harder to fake.

Averaging fingerprints over different depths may require additional procedures compared to averaging surface fingerprints over time. Fingerprint images at different depths may be slightly different and may require certain corrections before the averaging process. In addition to the more obvious deformation corrections, under some conditions image inversion may be required. The required additional procedures may be learned during the enrollment process when the user first enters his or her fingerprints. By comparing the fingerprints at different depths during the enrollment process, their similarities and differences may be recorded and any additional processing that is required in the depth averaging process may be determined and stored for later use In some embodiments, input image set 705 is acquired using an ultrasonic sensor (e.g., ultrasonic sensor 200) having a varying configuration, where the configuration can refer to an imaging depth of an image. In another embodiment, the configuration refers to a beam forming position of the ultrasonic sensor (e.g., beam forming at the center of ultrasonic transducers of the ultrasonic sensor or beam forming at an edge of ultrasonic transducers of the ultrasonic sensor.

Reference image selector 710 is operable to select an image of input image set 705 as a reference image. A reference image, as used herein, refers to an image to which other images of input image set 705 are compared for purposes of selective inclusion for image averaging. In one embodiment, reference image selector 710 selects an image of input image set 705 having a highest contrast/contrast-to-noise level of the images of input image set 705 as the reference image. In one embodiment, reference image selector 710 is configured to determine a contrast for the images of input image set 705. In another embodiment, reference image selector 710 selects an image of input image set 705 having maximum variance of the grey levels of the images of input image set 705 as the reference image. It should be appreciated that reference image selector 710 operates in a similar manner as reference image selector 410 of FIG. 4.

Image subsection difference determiner 720 is operable to determine whether a subsection of an image is similar enough to the corresponding subsection of the reference image for inclusion in the image average. In some embodiments, image subsection difference determiner 720 includes image aligner 722 for aligning an image to the reference image prior to performing any image difference determination. Image aligner 722 is operable to align images with the reference image, such that image difference determination is performed on aligned images. It should be appreciated that the examples of FIG. 5 can be utilized by image aligner 722 is performing image alignment to a reference image. Moreover, it should be appreciated that other image alignment operations may be utilized by image aligner 722.

In some embodiments, image subsection difference determiner 720 determines a difference between subsections of the reference image and spatially corresponding subsections of each image of the input image set 705. For example, the difference determination can be performed at a subsection level or a pixel level, wherein a subsection/pixel for the image is compared to a spatially corresponding subsection/pixel of the reference image. The difference can be based on a gray level difference, where the difference is a number of gray levels between the compared subsection/pixel. In other embodiments, other difference determinations can be used, such as a color value difference. The energy of the differences is then determined, where the energy is based on a summation of the subsection/pixel differences for the subsection. An energy of the differences is generated for each subsection of each image of input image set 705.

Image subsection selector 730 is operable to determine whether a subsection of an image of input image set 705 is select for use in image averaging. In one embodiment, image subsection selector 730 receives the energy for each subsection of each image of input image set 705. The energy for each subsection is then compared to a threshold energy value. If the energy of a subsection satisfies the threshold (e.g., is not greater than the threshold energy value), the subsection is selected for inclusion in image averaging. Alternatively, if the energy of a subsection does not satisfy the threshold (e.g., is greater than the threshold energy value), the subsection is not selected for inclusion in image averaging. In one embodiment, subsections selected for inclusion in image averaging are forwarded to image averager 740.

Image averager 740 is operable to perform image averaging on the selected subsections of input image set 705.

Image averager 740 computes image average intensity for pixels of the input image set 705, generating image average 750. By disregarding subsections of input image set 705 that are determined to be less similar to a spatially corresponding subsection of reference image, image average 750 is an image of enhanced quality relative to an image average based on all images of input image set 705, including those subsections that are less similar to a reference image.

Figure 8:
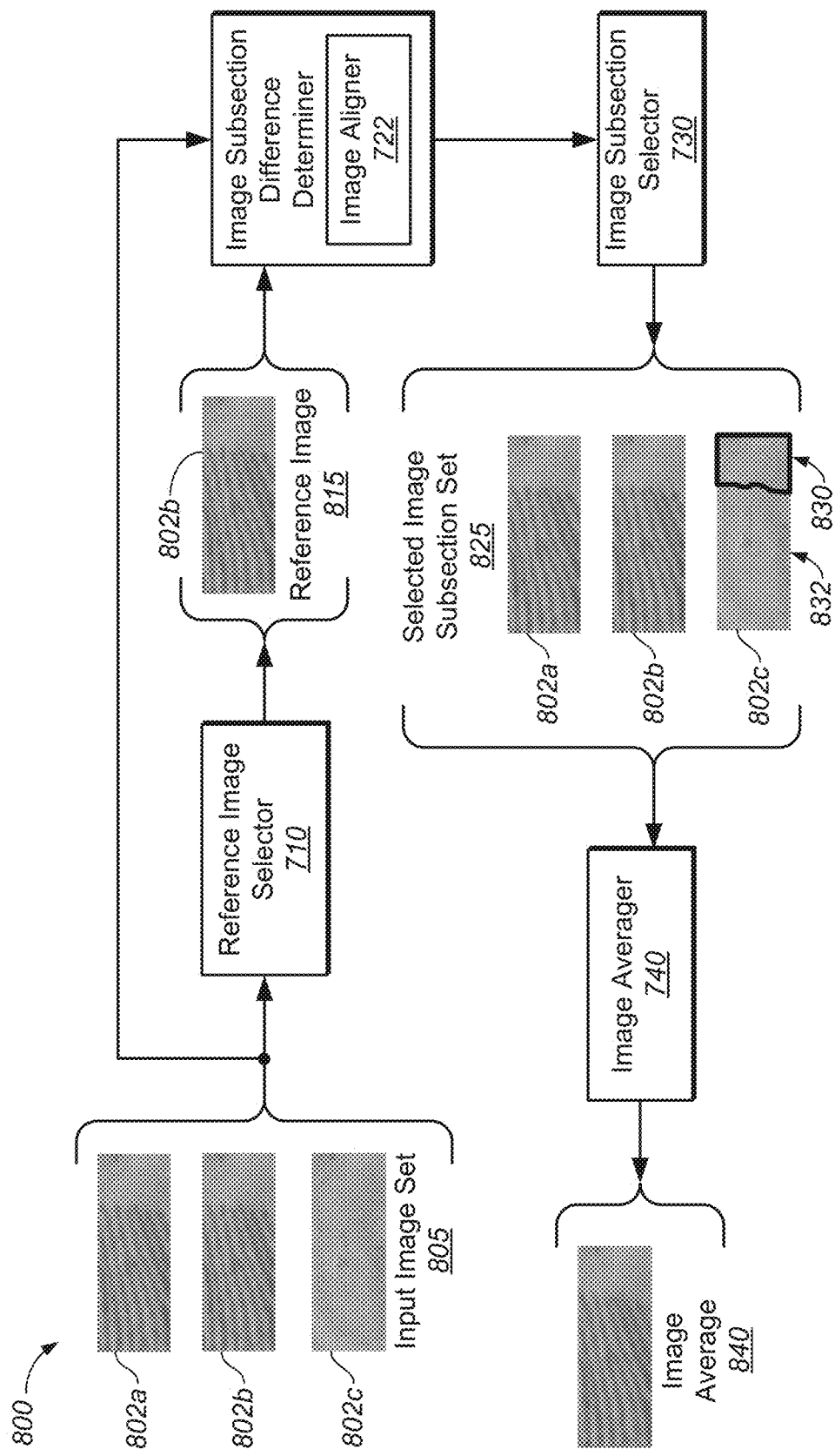
FIG. 8 illustrates an example data flow diagram of the system of FIG. 7, according to some embodiments.

FIG. 8 illustrates an example data flow diagram 800 of system 700 of FIG. 7, according to some embodiments. Input image set 805 is received at reference image selector 710. As illustrated, input image set includes three input images 802*a*, 802*b*, and 802*c*. It should be appreciated that input image set 805 may include any number of images. The illustration of three input images is for brevity and clarity only. In one embodiment, input image set 805 includes images captured in a temporal sequence. In another embodiment, input image set 805 includes images of a fingerprint captured at sequential depths. It should be appreciated that in accordance with some embodiments, images captured at sequential depths may also be temporally sequential.

Reference image selector 710 is operable to select an image of input image set 805 as a reference image 815. Reference image 815 is used as an image to which other images of input image set 805 are compared to for purposes of selective inclusion for image averaging. In one embodiment, reference image selector 710 selects an image of input image set 805 having a highest contrast of the images of input image set 805 as the reference image. In one embodiment, reference image selector 710 is configured to determine a contrast for the images of input image set 805. As illustrated, input image 802*b* is selected as reference image 815.

Image subsection difference determiner 720 is operable to determine whether an image subsection is similar enough to a spatially corresponding subsection of reference image 815 for inclusion in the image average. In some embodiments, image subsection difference determiner 720 includes image aligner 722 for aligning an image to reference image 815 prior to performing any image difference determination. Image aligner 722 is operable to align images with reference image 815, such that image difference determination is performed on aligned images. It should be appreciated that the examples of FIG. 5 can be utilized by image aligner 722 is performing image alignment to reference image 815. Moreover, it should be appreciated that other image alignment operations may be utilized by image aligner 722. In some embodiments, image aligner 722 may only align image subsections with reference image 815.

Image subsection difference determiner 720 determines a difference between a subsection of reference image 815 and a spatially corresponding subsection of each image of the input image set 805. For example, the difference determination can be performed at a subsection level or a pixel level, wherein a subsection/pixel for the image is compared to a spatially corresponding subsection/pixel of the reference image. The difference can be based on a gray level difference, where the difference is a number of gray levels between the compared subsection/pixel. In other embodiments, other difference determinations can be used, such as a color value difference. The energy of the differences is then determined, where the energy is based on a summation of the subsection/pixel differences for the subsection. An energy of the differences is generated for each subsection of each image of input image set 805.

Image subsection selector 730 is operable to determine whether an image subsection of input image set 805 is selected for use in image averaging. In one embodiment, image subsection selector 730 receives the energy for each image subsection of input image set 805. The energy for each image subsection is then compared to a threshold energy value. If the energy of an image subsection satisfies the threshold (e.g., is not greater than the threshold energy value), the image subsection is selected for inclusion in selected image subsection set 825 for use in image averaging. Alternatively, if the energy of an image does not satisfy the threshold (e.g., is greater than the threshold energy value), the subsection image is not selected for inclusion in selected image subsection set 825 for use in image averaging. In one embodiment, selected image subsection set 825 is forwarded to image averager 740. As illustrated, complete input images 802*a* and 802*b* are selected for inclusion in selected image subsection set 825, as well as image subsection 830 of input image 802*c*. Image subsection 832 of input image 802*c* is not selected for inclusion in selected image subsection set 825.

Image averager 740 is operable to perform image averaging on image subsections of selected image subsection set 825. Image averager 740 computes image average intensity for pixels of the selected image subsection set 825, generating image average 840. Image averager 740 generates image average 840 by averaging the spatially corresponding pixels for the selected image subsection set 825. As illustrated, subsections/pixels of selected image subsection set 825 that spatially correspond with image subsection 830 are averaged (e.g., three values are averaged) and subsections/pixels of selected image subsection set 825 that do not spatially correspond with image subsection 830 are averaged (e.g., two values are averaged). By disregarding image subsections of input image set 805 that are determined to be less similar to spatially corresponding subsections of reference image 815, image average 840 is an image of enhanced quality relative to an image average based on all images of input image set 805, including those that are less similar to reference image 815.

It should be appreciated that embodiments of the image averaging process described above may be formed on an input image set of a fixed size, with a predetermined number of images in the input image set. Alternatively, the averaging process may require a predetermined number of images or image subsection to be averaged such that the input image set is adapted in order to obtain sufficient images that qualify for averaging after comparison to the reference image. In some embodiments, the image averaging process may continue until certain quality criteria or conditions are satisfied. For examples, the image averaging process may continue until the image average has, for example, a certain predetermined noise level, signal-to-noise level, or contrast-to-noise level. In addition, certain latency criteria may exist to define the response time of the system. Since the image averaging in a temporally sequential image set requires the passage of time, under some conditions where many images are required to satisfy the quality conditions, the image averaging may take too much time, and the latency criteria may stop the image averaging process before the quality criteria are met. In this case, there is a tradeoff between the quality criteria and the latency criteria. In some embodiments, information from the motion sensor may also be used to control the image averaging process. For example, motion criteria may be used to indicate the likelihood of increasing the image quality through an extended image averaging process. In situation where a lot of motion is present, the various images may be difficult to align and extending the image averaging process to obtain more images may only increase the latency without increasing the quality of the image average. Therefore, a motion threshold may be used, above with the average process may not be extended.

In some embodiments, the quality criteria may be variable and the image averaging process may receive the quality criteria from the system, host processor, or application layer. For example, different applications running on the system may require user authentication by means of a fingerprint, but different application may require different level of authentication related to the different levels of required security. For example, banking applications a high level of security is required, which may therefore require a higher qualify criteria for the images, since the images may be analyzed by the image matcher with a greater scrutiny (to avoid fraud). The image matcher is the part of the system that compares the acquired fingerprint images with the certified fingerprint images of the user acquired during the enrollment process. For applications that require/demand a higher quality of the image average, the latency criteria may be more relaxed.

Example Methods of Operation

Figure 9A:
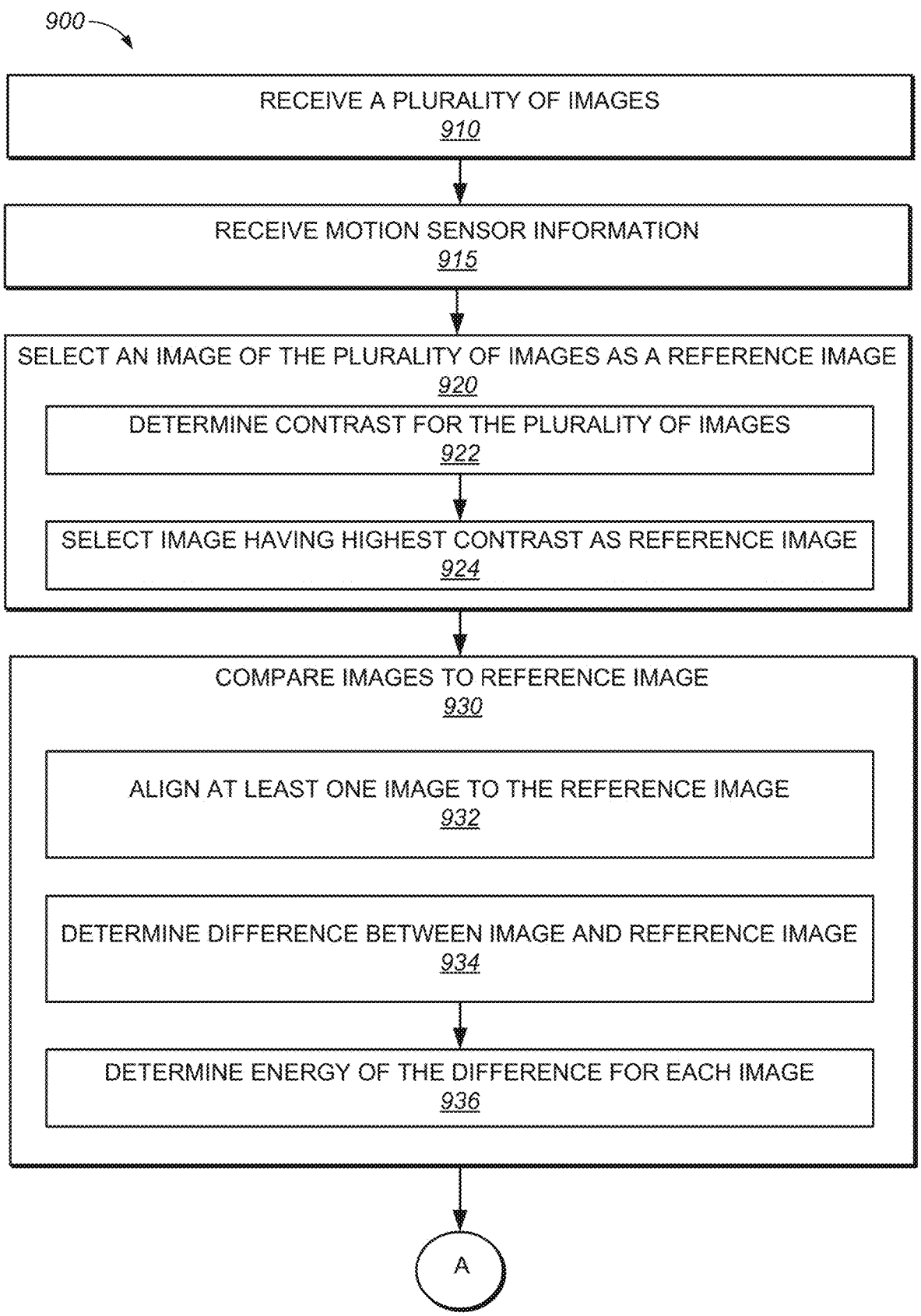
FIGS. 9A and 9B illustrate a flow chart of an example method for enhancing quality of a fingerprint image, according to a first embodiment.
Figure 9B:
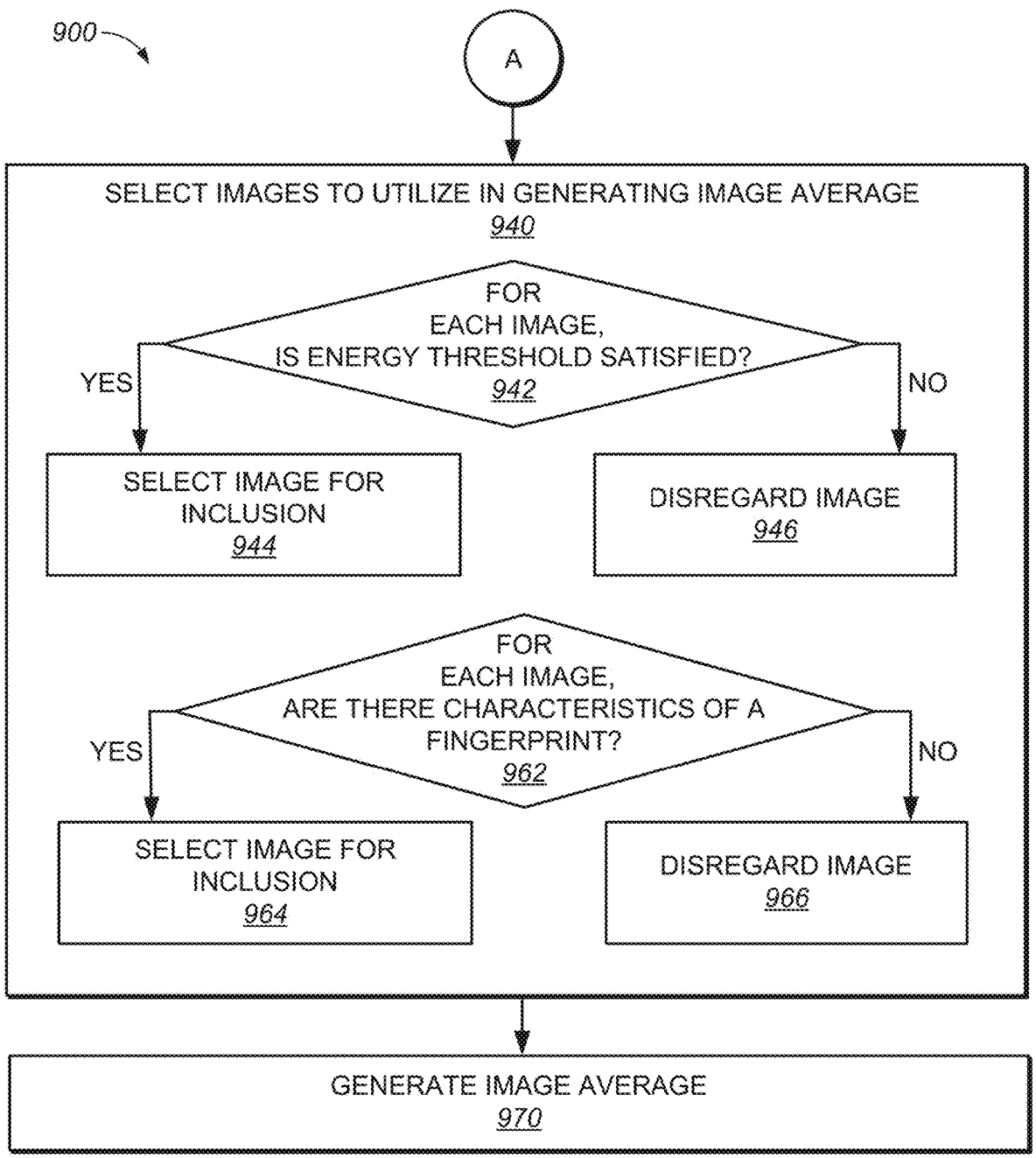

FIGS. 9A and 9B illustrate a flow diagram 900 of an example method for enhancing quality of a fingerprint image, according to a first embodiment. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 900 includes some procedures that, in various embodiments, are carried out by one or more processors (e.g., host processor 110 or sensor processor 172 of FIG. 1 or array controller 220 of FIG. 2) under the control of computer-readable and computer-executable instructions that are stored on non-transitory computer-readable storage media. It is further appreciated that one or more procedures described in flow diagram 900 may be implemented in hardware, or a combination of hardware with firmware and/or software.

At procedure 910 of flow diagram 900, a plurality of images (e.g., input image set 405 or input image set 605) is received. In one embodiment, the plurality of images comprises fingerprint images. In one embodiment, the fingerprint images include images captured in a temporal sequence. In another embodiment, the fingerprint images include sequential depths of a fingerprint. In one embodiment, as shown at procedure 915, motion sensor information is received.

At procedure 920, an image of the plurality of images is selected as a reference image (e.g., reference image 615). In one embodiment, as shown at procedure 922, a contrast for images of the plurality of images is determined. At procedure 924, the image of the plurality of images having a highest contrast or contrast-to-noise level is selected as the reference image.

At procedure 930, the images of the plurality of images are compared to the reference image. In one embodiment, as shown at procedure 932, at least one image is aligned to the reference image. In one embodiment, a translation and a rotation of the fingerprint of the image relative to the reference image is determined. An image transformation operation based on the translation and rotation is applied to the image. In one embodiment, as shown at procedure 934, a difference between the reference image and each image of the plurality of images is determined. At procedure 936, an energy of the difference of each image of the plurality of images is determined.

With reference to FIG. 9B, at procedure 940, images of the plurality of images are selected for utilization in generating an image average. In one embodiment, the selection of subsections of images to utilize in generating an image average of the plurality of images is also based at least in part of the motion sensor information. In one embodiment, as shown at procedure 942, it is determined, for each image, whether the energy threshold is satisfied. Provided the energy of an image of the plurality of images satisfies an energy threshold, as shown at procedure 944, the image is selected for use in generating the image average of the plurality of images (e.g., included in selected image set 625). Provided the energy of an image of the plurality of images does not satisfy the energy threshold, as shown at procedure 946, the image is disregarded for use in generating the image average of the plurality of images.

In one embodiment, as shown at procedure 962, it is determined, for each image, whether the image includes characteristics of a fingerprint. Provided the image includes characteristics of a fingerprint, as shown at procedure 964, the image is selected for use in generating the image average of the plurality of images (e.g., included in selected image set 625). Provided the image does not include characteristics of a fingerprint, as shown at procedure 966, the image is disregarded for use in generating the image average of the plurality of images.

At procedure 970, an image average (e.g., image average 450 or image average 630) is generated based on the selected image set.

Figure 10A:
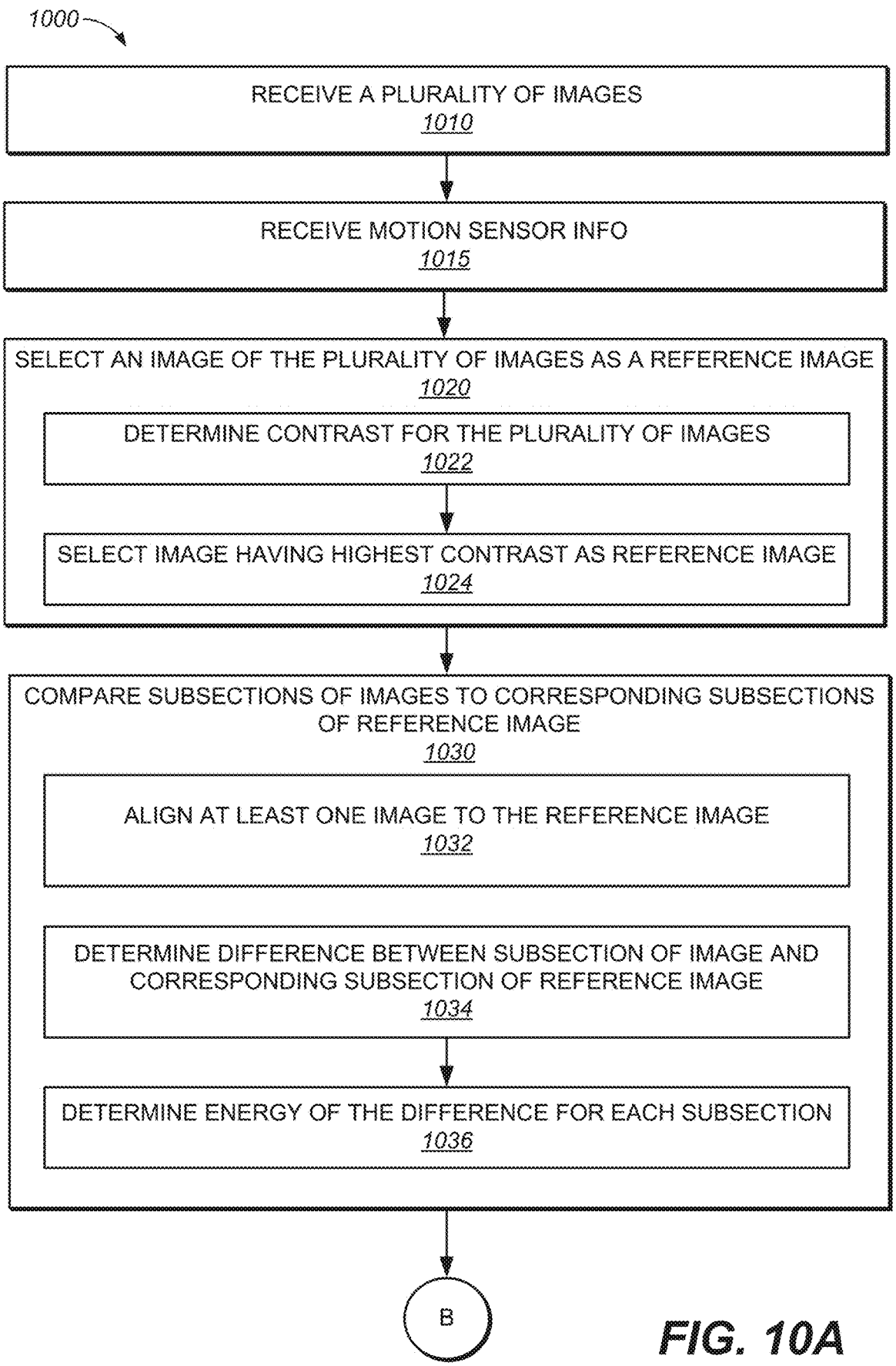
FIGS. 10A and 10B illustrate a flow chart of an example method for enhancing quality of a fingerprint image, according to a second embodiment.
Figure 10B:
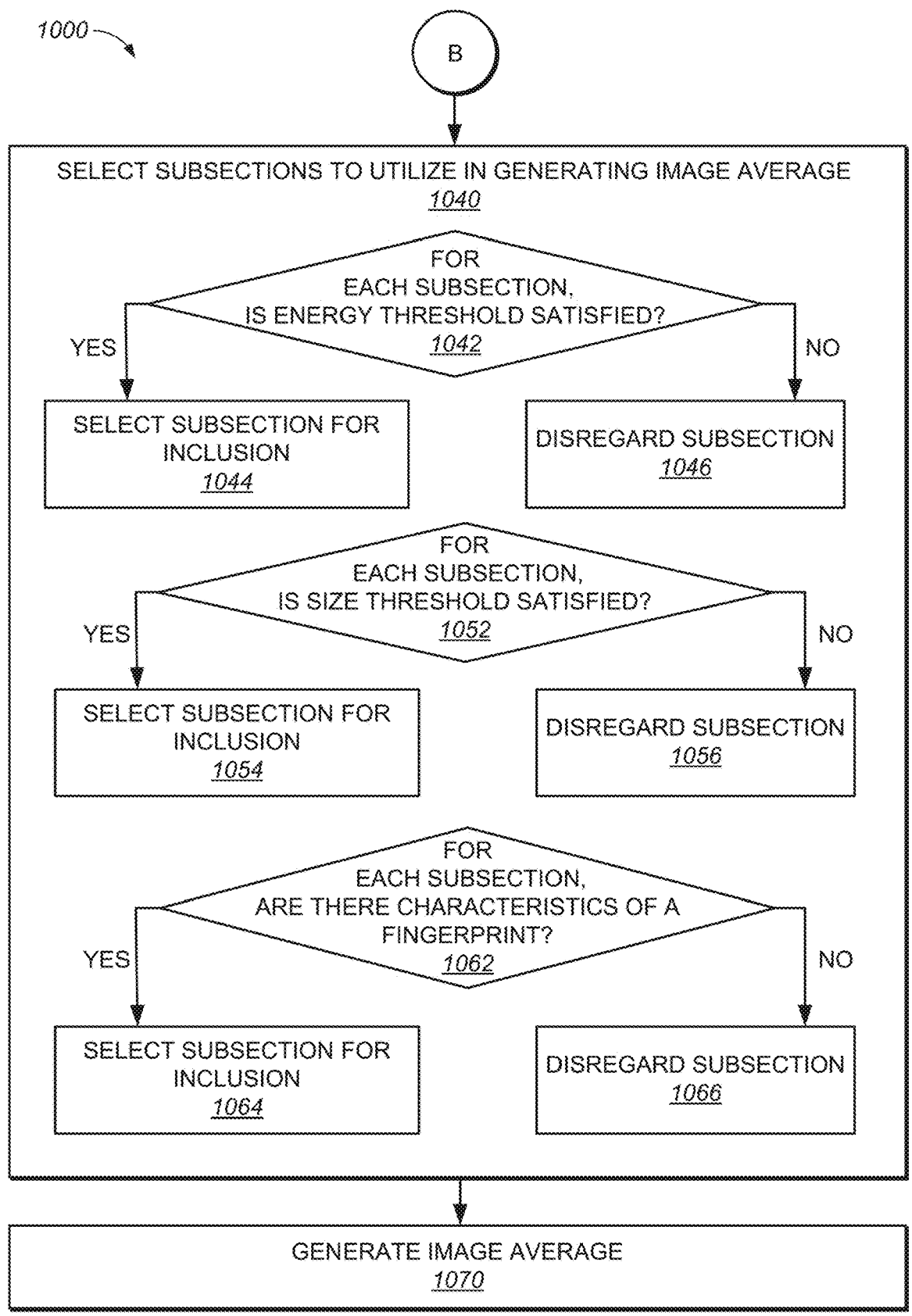

FIGS. 10A and 10B illustrate a flow diagram 1000 of an example method for enhancing quality of a fingerprint image, according to a first embodiment. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 1000 includes some procedures that, in various embodiments, are carried out by one or more processors (e.g., host processor 110 or sensor processor 172 of FIG. 1 or array controller 220 of FIG. 2) under the control of computer-readable and computer-executable instructions that are stored on non-transitory computer-readable storage media. It is further appreciated that one or more procedures described in flow diagram 1000 may be implemented in hardware, or a combination of hardware with firmware and/or software.

With reference to FIG. 10A, at procedure 1010 of flow diagram 1000, a plurality of images (e.g., input image set 705 or input image set 805) is received. In one embodiment, the plurality of images comprises fingerprint images. In one embodiment, the fingerprint images include images captured in a temporal sequence. In another embodiment, the fingerprint images include sequential depths of a fingerprint. In one embodiment, as shown at procedure 1015, motion sensor information is received.

At procedure 1020, an image of the plurality of images is selected as a reference image (e.g., reference image 815). In one embodiment, as shown at procedure 1022, a contrast for images of the plurality of images is determined. At procedure 1024, the image of the plurality of images having a highest contrast is selected as the reference image.

At procedure 1030, subsections of images of the plurality of images are compared to spatially corresponding subsection of the reference image. In one embodiment, the subsections are pixels. In another embodiment, the subsections correspond to regions of an ultrasonic fingerprint sensor (e.g., sub-blocks 202 of ultrasonic sensor 200) upon which the plurality of images were captured. In one embodiment, as shown at procedure 1032, at least one image is aligned to the reference image. In one embodiment, a translation and a rotation of the fingerprint of the image relative to the reference image is determined. An image transformation operation based on the translation and rotation is applied to the image. In one embodiment, as shown at procedure 1034, a difference between the subsection of the reference image and the spatially corresponding subsection of each image of the plurality of images is determined. At procedure 1036, an energy of the difference of the subsections of each image of the plurality of images is determined.

With reference to FIG. 10B, at procedure 1040, subsections of images of the plurality of images are selected for utilization in generating an image average. In one embodiment, the selection of subsections of images to utilize in generating an image average of the plurality of images is also based at least in part of the motion sensor information.

In one embodiment, as shown at procedure 1042, it is determined, for each subsection of each image, whether the energy threshold is satisfied. Provided the energy of a subsection of an image of the plurality of images satisfies an energy threshold, as shown at procedure 1044, the subsection is selected for use in generating the image average of the plurality of images (e.g., included in selected image subsection set 825). Provided the energy of a subsection of an image of the plurality of images does not satisfy the energy threshold, as shown at procedure 1046, the subsection is disregarded for use in generating the image average of the plurality of images.

In one embodiment, as shown at procedure 1052, it is determined, for each subsection of each image, whether the size threshold is satisfied. Provided the size of a subsection of an image of the plurality of images satisfies a size threshold (e.g., is sufficiently large), as shown at procedure 1054, the subsection is selected for use in generating the image average of the plurality of images (e.g., included in selected image subsection set 825). Provided the size of a subsection of an image of the plurality of images does not satisfy the size threshold, as shown at procedure 1056, the subsection is disregarded for use in generating the image average of the plurality of images.

In one embodiment, as shown at procedure 1062, it is determined, for each subsection of each image, whether the image includes characteristics of a fingerprint. Provided the subsection includes characteristics of a fingerprint, as shown at procedure 1064, the subsection is selected for use in generating the image average of the plurality of images (e.g., included in selected image subsection set 825). Provided the subsection does not include characteristics of a fingerprint, as shown at procedure 1066, the subsection is disregarded for use in generating the image average of the plurality of images.

At procedure 1070, an image average (e.g., image average 750 or image average 840) is generated based on the selected image set.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for enhancing quality of a fingerprint image, the method comprising:
   receiving a plurality of images, wherein the plurality of images comprises fingerprint images corresponding to different temporal ranges of an acoustic signal;
   selecting an image of the plurality of images as a reference image;
   comparing subsections of each image of the plurality of images to corresponding subsections of the reference image;
   selecting, based on the comparing, the subsections of each image of the plurality of images to utilize in generating an image average of the plurality of images; and
   generating an image average of the plurality of images utilizing selected subsections of the plurality of images.

2. The method of claim 1, wherein the fingerprint images comprise images captured in a temporal sequence.

3. The method of claim 1, wherein the fingerprint images comprise sequential depths of a fingerprint.

4. The method of claim 1, wherein the different temporal ranges correspond to different amounts of reflection of the acoustic signal.

5. The method of claim 1, wherein the selecting the image of the plurality of images as the reference image comprises:
   determining a contrast for the plurality of images; and
   selecting the image of the plurality of images having a highest contrast as the reference image.

6. The method of claim 1, wherein the comparing subsections of each image of the plurality of images to corresponding subsections of the reference image comprises:
   determining a difference between each subsection of the reference image and each corresponding subsection of each image of the plurality of images; and
   determining an energy of the difference of each subsection of each image of the plurality of images.

7. The method of claim 6, wherein the selecting, based on the comparing, the subsections of each image of the plurality of images to utilize in generating an image average of the plurality of images comprises:

for each subsection of the plurality of images:
provided the energy of a subsection of an image of the plurality of images satisfies a threshold, selecting the subsection for use in generating the image average of the plurality of images.

8. The method of claim 1, wherein the comparing subsections of each image of the plurality of images to corresponding subsections of the reference image comprises:
determining a difference between the reference image and each image of the plurality of images; and
determining an energy of the difference of each image of the plurality of images.

9. The method of claim 8, wherein the selecting, based on the comparing, the subsections of each image of the plurality of images to utilize in generating an image average of the plurality of images comprises:
for each image of the plurality of images:
provided the energy of an image of the plurality of images satisfies a threshold, selecting the image for use in generating the image average of the plurality of images.

10. The method of claim 1, wherein the comparing subsections of each image of the plurality of images to corresponding subsections of the reference image comprises:
aligning at least one image of the plurality of images to the reference image.

11. The method of claim 10, wherein the aligning at least one image of the plurality of images to the reference image comprises:
determining a translation and a rotation of a fingerprint of the at least one image relative to the reference image; and
applying an image transformation operation to the at least one image based on the translation and rotation.

12. The method of claim 10, wherein the aligning at least one image of the plurality of images to the reference image comprises:
determining a vector field representing a translation of the at least one image relative to the reference image; and
applying an image transformation operation to the at least one image based on the vector field.

13. The method of claim 1, further comprising:
receiving motion sensor information from a motion sensor;
wherein the selecting, based on the comparing, the subsections of each image of the plurality of images to utilize in generating an image average of the plurality of images is also based at least in part of the motion sensor information.

14. The method of claim 1, wherein the subsections of each image are pixels.

15. The method of claim 1, wherein the selecting, based on the comparing, the subsections of each image of the plurality of images to utilize in generating an image average of the plurality of images comprises:
for each subsection of the plurality of images:
provided the subsection of an image does not satisfy a subsection size threshold, not selecting the subsection for use in generating the image average of the plurality of images.

16. The method of claim 1, wherein the selecting, based on the comparing, the subsections of each image of the plurality of images to utilize in generating an image average of the plurality of images comprises:
for each subsection of the plurality of images:
determining whether the subsection of the image comprises characteristics of a fingerprint; and
provided the subsection of an image does not comprise characteristics of a fingerprint, not selecting the subsection for use in generating the image average of the plurality of images.

17. The method of claim 1, wherein the subsections of each image correspond to regions of an ultrasonic fingerprint sensor upon which the plurality of images are captured.

18. The method of claim 1, further comprising:
repeating the generating the image average of the plurality of images until a quality criteria is satisfied.

19. The method of claim 18, wherein the quality criteria is dependent on an application utilizing the image average.

20. An ultrasonic fingerprint sensor unit comprising:
an array of ultrasonic transducers for emitting acoustic signals and capturing reflected acoustic signals from a finger interacting with the ultrasonic fingerprint sensor; and
a processor capable of enhancing quality of a fingerprint image, wherein the processor is operable to:
receive a plurality of images generated based on the reflected acoustic signals, wherein the plurality of images comprises fingerprint images;
select an image of the plurality of images as a reference image;
compare subsections of each image of the plurality of images to corresponding subsections of the reference image, wherein the compare comprises:
determine a difference between each subsection of the reference image and each corresponding subsection of each image of the plurality of images; and
determine an energy of the difference of each subsection of each image of the plurality of images;
select, based on the compare, the subsections of each image of the plurality of images to utilize in generating an image average of the plurality of images; and
generate the image average of the plurality of images utilizing selected subsections of the plurality of images.

21. A mobile electronic device comprising:
a host processor;
a host memory;
a motion sensor; and
an ultrasonic fingerprint sensor device comprising:
an array of ultrasonic transducers for emitting acoustic signals and capturing reflected acoustic signals from a finger interacting with the ultrasonic fingerprint sensor; and
a sensor processor;
wherein the mobile electronic device is capable of enhancing quality of a fingerprint image, wherein the mobile electronic device is operable to:
receive a plurality of images generated based on the reflected acoustic signals, wherein the plurality of images comprises fingerprint images;
receive motion sensor information from a motion sensor;
select an image of the plurality of images as a reference image;
compare subsections of each image of the plurality of images to corresponding subsections of the reference image;

select, based on the compare, the subsections of each image of the plurality of images to utilize in generating an image average of the plurality of images is based at least in part of the motion sensor information; and generate the image average of the plurality of images utilizing selected subsections of the plurality of images.

22. The mobile electronic device of claim 21, wherein operations associated with the enhancing quality of the fingerprint image are performed at the sensor processor, the host processor, or the sensor processor and the host processor in combination.

23. A method for enhancing quality of a fingerprint image, the method comprising:

receiving a plurality of images, wherein the plurality of images comprises fingerprint images;

selecting an image of the plurality of images as a reference image, wherein the selecting the image of the plurality of images as the reference image comprises:
determining a contrast for the plurality of images; and
selecting the image of the plurality of images having a highest contrast as the reference image;

comparing subsections of each image of the plurality of images to corresponding subsections of the reference image;

selecting, based on the comparing, the subsections of each image of the plurality of images to utilize in generating an image average intensity of the plurality of images; and generating an image average intensity of the plurality of images utilizing selected subsections of the plurality of images.

24. A method for enhancing quality of a fingerprint image, the method comprising:

receiving a plurality of images, wherein the plurality of images comprises fingerprint images;

selecting an image of the plurality of images as a reference image;

comparing subsections of each image of the plurality of images to corresponding subsections of the reference image;

selecting, based on the comparing, the subsections of each image of the plurality of images to utilize in generating an image average of the plurality of images, wherein the selecting, based on the comparing, the subsections of each image of the plurality of images to utilize in generating an image average of the plurality of images comprises:
for each subsection of the plurality of images:
determining whether the subsection of the image comprises characteristics of a fingerprint; and
provided the subsection of an image does not comprise characteristics of a fingerprint, not selecting the subsection for use in generating the image average of the plurality of images; and generating an image average of the plurality of images utilizing selected subsections of the plurality of images.

25. A method for enhancing quality of a fingerprint image, the method comprising:

receiving a plurality of images, wherein the plurality of images comprises fingerprint images;

selecting an image of the plurality of images as a reference image;

comparing subsections of each image of the plurality of images to corresponding subsections of the reference image;

selecting, based on the comparing, the subsections of each image of the plurality of images to utilize in generating an image average intensity of the plurality of images;

generating an image average intensity of the plurality of images utilizing selected subsections of the plurality of images; and repeating the generating the image average intensity of the plurality of images until a quality criteria is satisfied.

* * * * *